Figure 1:
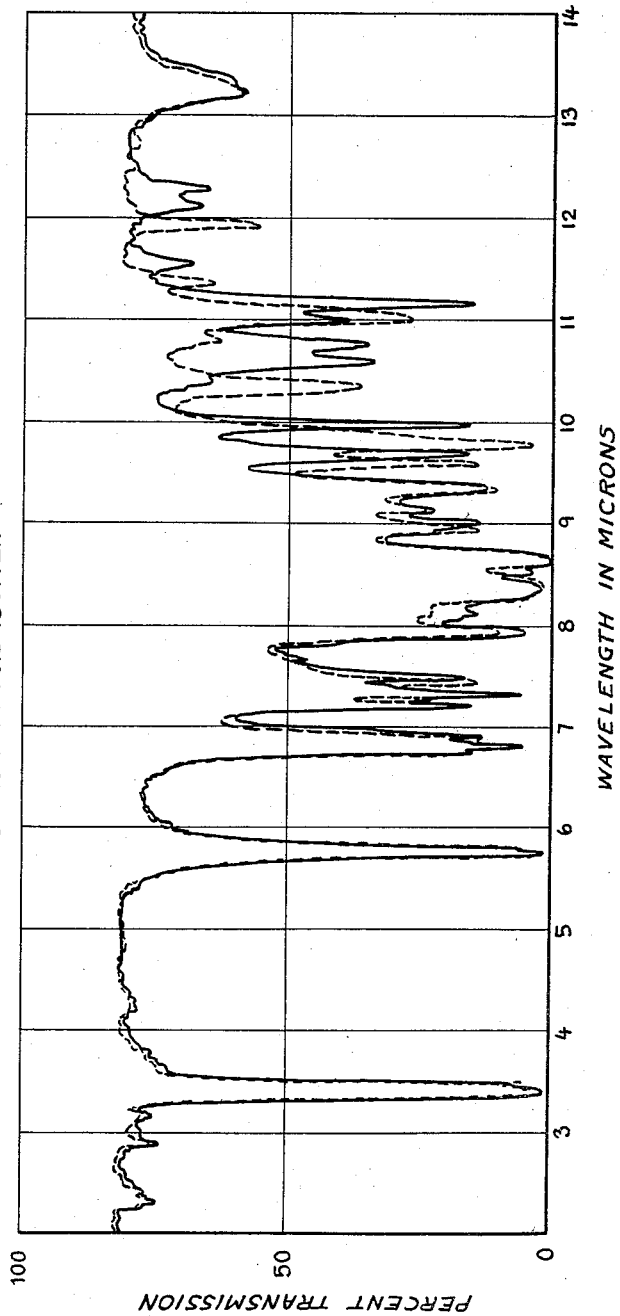

INVENTORS
WILLARD T. SOMERVILLE.
ERNST T. THEIMER.
BY
Ward, Neal, Haselton, Orme & McChannon
ATTORNEYS.

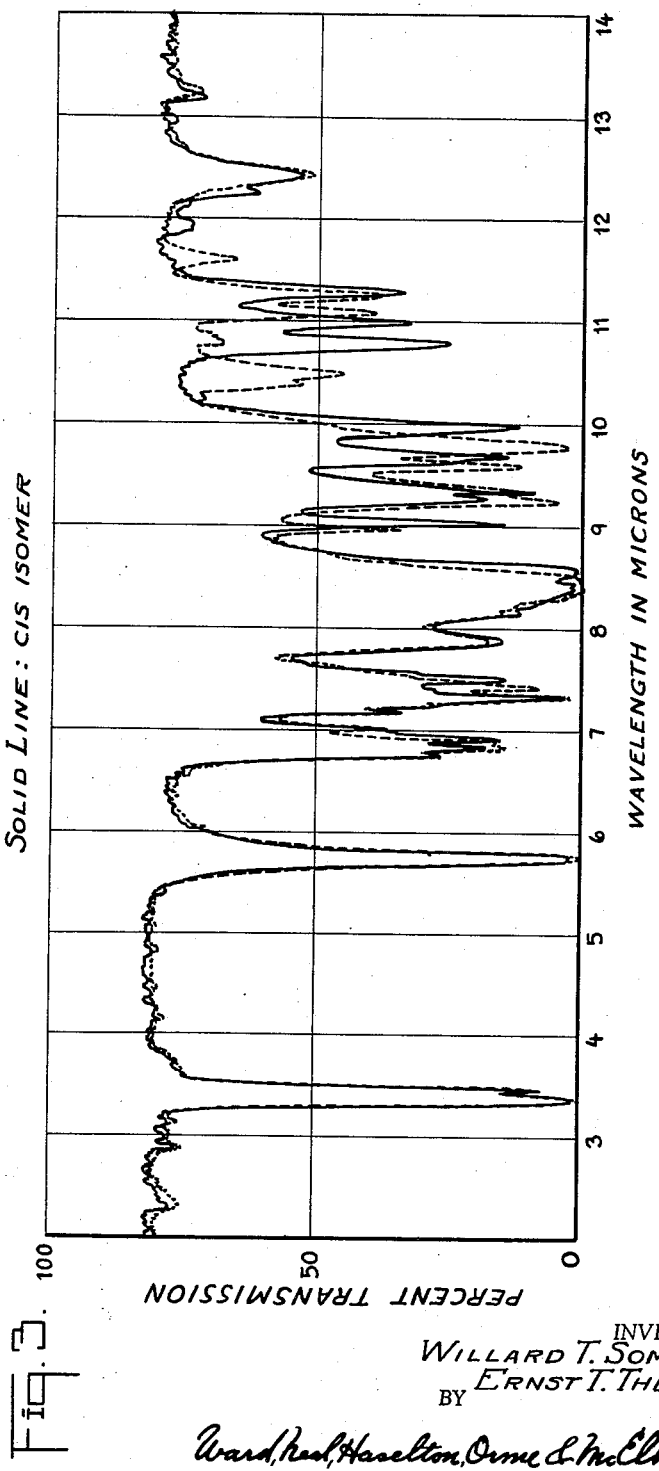

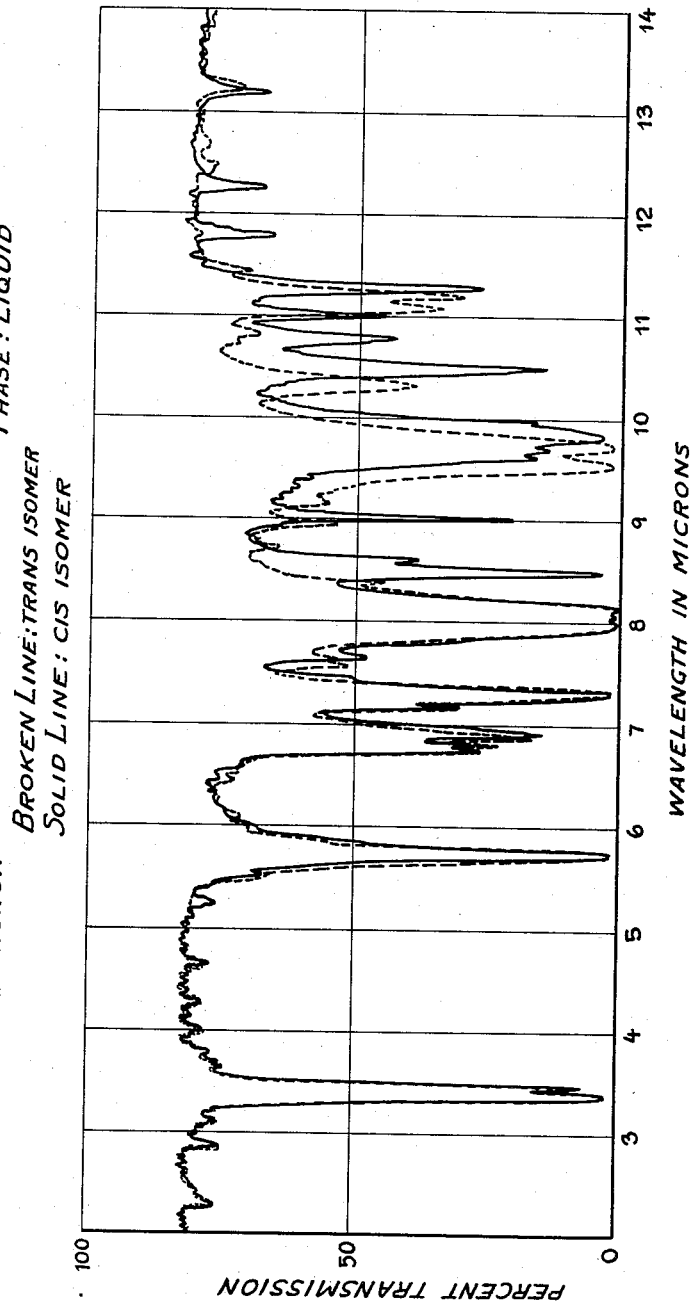

United States Patent Office 2,840,599
Patented June 24, 1958

2,840,599

LOWER ALKANOIC ACID ESTERS OF PARA TERTIARY BUTYL CYCLOHEXANOL

Willard T. Somerville, Fair Haven, and Ernst T. Theimer, Rumson, N. J., assignors to Van Ameringen-Haebler, Inc., New York, N. Y., a corporation of New York Application January 28, 1957, Serial No. 636,692

5 Claims. (Cl. 260—488)

This invention relates to lower aliphatic acid esters of para tertiary butyl cyclohexanol.

The principal object of the invention is to devise such compounds suitable as perfume bases and to devise a simple method for producing same.

Para tertiary butyl cyclohexanol can be made by the hydrogenation of para tertiary butyl phenol with nickel catalyst. The product para tertiary butyl cyclohexanol when acetylized is a perfume material. Para tertiary butyl cyclohexanol is made up of two isomers, namely, a cis and trans isomer. These isomers at equilibrium are present in proportions of approximately 30% cis isomer and 70% trans isomer. These proportions are not materially altered by acetylation. We have found in accordance with our invention that although the trans isomer of the acetate which is present in the much larger amount has some odor, the cis isomer present in the lesser amount has an odor several times the strength of the trans isomer. The problem to be solved accordingly was how to obtain the cis isomer in an increased amount over that obtained by the direct acetylation of the equilibrium mixture and to end up with a product in which the cis isomer was in major or predominating proportions.

The reaction involved is as follows:

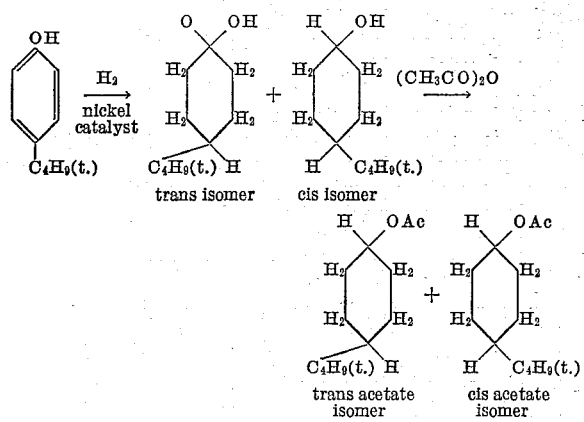

From the mixture of cis and trans acetates formed above we have prepared the two isomers in pure form by careful fractionation. The odor strength of the separate isomers was then established upon evaluation by a skilled perfumer. The cis isomer was found to be approximately three times as strong as the trans isomer and accordingly would be greatly preferred not only because of its difference in odor strength but also because of its finer and less fatty odor.

We have also found in accordance with our invention that we can produce such predominating proportions of the cis isomer of para tertiary butyl cyclohexanol by carrying out the hydrogenation of the para tertiary butyl phenol using rhodium as a hydrogenation catalyst. We have also found that the equilibrium mixture containing about 70% of the trans isomer and 30% of the cis isomer may be transformed into a mixture in which the cis isomer predominates by fractionally distilling away the lower boiling cis isomer, while continuously isomerizing the undistilled portion by means of a suitable catalyst.

In each of the processes mentioned the resulting cis-trans mixture may contain more than 80% of the cis isomer. When this mixture was then converted into the acetate as, for example, by means of acetic anhydride, the resulting perfume material was more than twice as strong as was that obtained from the equilibrium mixture.

In addition to the acetate, other lower aliphatic acid esters, namely, the propionate, butyrate and isobutyrate have been prepared, each of them being a valuable perfume material. In every case the cis isomer ester was two to five times as strong as the corresponding trans isomer.

The following are examples of the manner in which we propose to carry out our invention. It should be understood that these examples are illustrative and that the invention is not to be considered as restricted thereto except as indicated in the appended claims.

Example 1.—300 grams of para tertiary butyl phenol are dissolved in 300 ml. of specially denatured ethyl alcohol No. 1, the mixture placed in a stirring autoclave, and 15 grams of 5% rhodium on carbon are added. The mixture is gently warmed to 90 to 100° F. (37–38° C.). The autoclave is pressured to 1000 pounds with hydrogen and stirring is started. The hydrogenation proceeds very rapidly and the absorption of hydrogen is essentially quantitative. The yield of hydrogenated material is approximately 95%.

The para tertiary butyl cyclohexanol formed when analyzed by vapor chromatography was found to contain 87.5% of the cis isomer.

For the preparation of the acetate, 196 grams of the cis para tertiary butyl cyclohexanol as obtained above is refluxed for five hours with an equal weight of acetic anhydride. After cooling, the mixture is decomposed by adding warm water and then the oily layer is washed neutral with water. The oil is separated and vacuum distilled. In this way 196 parts of para tertiary butyl cyclohexanyl acetate are obtained, analyzing by gas chromatography 83% of the cis isomer. The constants of the acetate were:

$D_{20}$—0.9350
$nD_{20}$—1.4507

Instead of hydrogenating para tertiary butyl phenol directly as above we may treat the equilibrium mixture containing approximately 30% cis and 70% trans para tertiary butyl cyclohexanol as prepared by hydrogenation with nickel catalyst in accordance with the following example:

Example 2.—Into a 1 liter distillation flask, equipped with a 24" long vacuum jacketed fractionation column, packed with meshed stainless steel fragments (so-called protruded packing), and topped by a reflux regulator, are placed 500 grams of commercial para tertiary butyl cyclohexanol (made in the usual manner by the hydrogenation of para tertiary butyl phenol with nickel catalyst). This commercial material contains about 85% para tertiary butyl cyclohexanol, the remaining 15% being impurities such as water, hydrocarbons, etc. Of the para tertiary butyl cyclohexanol, approximately 30% is the cis isomer and 70% the trans isomer, representing the equilibrium mixture of these materials.

The contents of the flask are heated at about 25 mm. vacuum and 100° C. to remove all water. The contents are then cooled and there is added 50 grams of a 13% solution of sodium isopropylate in isopropyl alcohol. The excess isopropyl alcohol and other low boiling material are removed by vacuum distilling at 75° C. and 25 mm. pressure; then the temperature is raised and the para tertiary butyl cyclohexanol is distilled at 140–170 mm. vacuum at a temperature of 160–170° C. at a five to one reflux ratio. This yields 350 grams of a mixture of para tertiary butyl cyclohexanol isomers with the cis predominating.

By varying the conditions of the distillation such as, for example, the length of the fractionating column, the type of packing, the reflux ratio, and the speed of the distillation, the cis isomer content of the para tertiary butyl cyclohexanol mixture obtained can be varied at will from that of the equilibrium mixture up to substantially pure cis isomer. For practical purposes, a final product containing a major proportion, that is, more than 50% cis isomer, constitutes a commercially valuable material.

The above mixture of isomers is refluxed five hours with 350 grams of acetic anhydride and distilled with a 12 inch column packed with ceramic Berl saddles to yield 404 grams of para tertiary butyl cyclohexanyl acetate, boiling at 70 to 75° C. at 3 mm. This material contains 84% cis and 16% trans isomers by infrared analysis. The material has an $nD_{20}$ of 1.4505, a $D_{15}$ of 0.9423, and an ester content of 99%.

We have found that the following alkaline isomerizing substances, when heated with para tertiary butyl cyclohexanol will cause isomerization of either isomer to the equilibrium mixture of approximately 30% cis and 70% trans: Sodium hydroxide, potassium hydroxide, aluminum isopropylate in the presence of a small amount of para tertiary butyl cyclohexanone, sodium methylate, sodium isopropylate, sodium hydride, Raney nickel and hydrogen.

Heating with the following materials does not cause isomerization: Aluminum isopropylate in the absence of ketones, aluminum metal, and heating in the absence of a catalyst.

The physical properties of cis and trans para tertiary butyl cyclohexanyl acetates are so close to each other that they cannot be used for identification or analysis. In order to distinguish between the two isomers it is necessary to use either infrared techniques or vapor chromatography.

In the following examples the formation of the propionate, butyrate and iso-butyrate esters compounds is given. In each of these examples the esters were formed from substantially pure cis para tertiary butyl cyclohexanol obtained by careful fractionation of the equilibrium mixture of cis and trans isomers thereof.

*Example 3.*—Preparation of cis-para tertiary butyl cyclohexanyl proprionate: 150 parts of cis-para tertiary butyl cyclohexanol are heated to 90° C., and 183 parts of propionic anhydride are gradually added. The mixture is then allowed to reflux for four hours. After cooling, it is decomposed with warm water, washed neutral in warm water and sodium carbonate solution, dried, and finally vacuum distilled. In this way the pure propionate, testing 99.64% ester is obtained. Its contents are $D_{20}$ of 0.9299 and $nD_{20}$ of 1.4513. The yield amounts to 175 parts of the ester. This propionate has a rich, fruity, woody odor and is approximately five times the strength of the trans isomer, which was separately prepared by an analogous procedure. The physical constants of the trans propionate are:

Ester content was 99.64%
Specific gravity at 20° C.—0.9291
Index of refraction—1.4531

*Example 4.*—Preparation of cis-para tertiary butyl cyclohexanyl butyrate: 150 parts of cis-para tertiary butyl cyclohexanol were heated at 80° C. for 4 hours with 316 parts of butyric anhydride and 1 part of 85% phosphoric acid. It was then cooled and decomposed with water. The oil was repeatedly washed with warm sodium bicarbonate solution to remove unreacted butyric anhydride. After drying the ester was then vacuum distilled. It boils at 85 to 86° C. at 2 to 3 mm. of mercury, and has a refractive index of 1.4511 at 20° C., and a density of 0.9229 at 20° C. The yield was approximately 165 parts. The trans isomer was separately prepared by an analogous procedure. Its physica constants are:

Ester content was 100.8%
Refraction index at 20° C.—1.4526
Specific gravity at 20° C.—0.9209

This cis isomer has an odor which is twice the strength of the trans isomer.

*Example 5.*—Preparation of cis-para tertiary butyl cyclohexanyl isobutyrate: This was made by refluxing a mixture of 150 parts of cis-para tertiary butyl cyclohexanol with 316 parts of isobutyric anhydride for 5 hours. It was cooled, washed with warm water, and then with hot sodium carbonate solution until neutralized. After drying it was vacuum distilled. The boiling point is 85° C. at 2 to 3 mm. The index of refraction at 20° C. is 1.4485. The specific gravity at 20° C. is 0.9162. This ester tests 97.18% by saponification. The yield is 160 parts of ester. The odor strength of the cis isomer was judged to be twice that of the trans isomer. The trans isomer was separately prepared by an analogous procedure. Its physical constants are:

Ester content was 98.5%
Specific gravity at 20° C.—0.9141
Index of refraction at 20° C.—1.4485

The cis and trans formate were made from the corresponding pure cyclohexanols employing formic acid.

The infrared spectra for each of the isomers of the above examples, namely the cis and trans compounds of the acetate, propionate, butyrate, and isobutyrate esters, were prepared and are shown on the attached drawings forming part of this application. It will be noted from the physical constants given in the examples that the numerical differences thereof are relatively small. The infrared spectra, however, show clearly the various differences.

Figure 2:
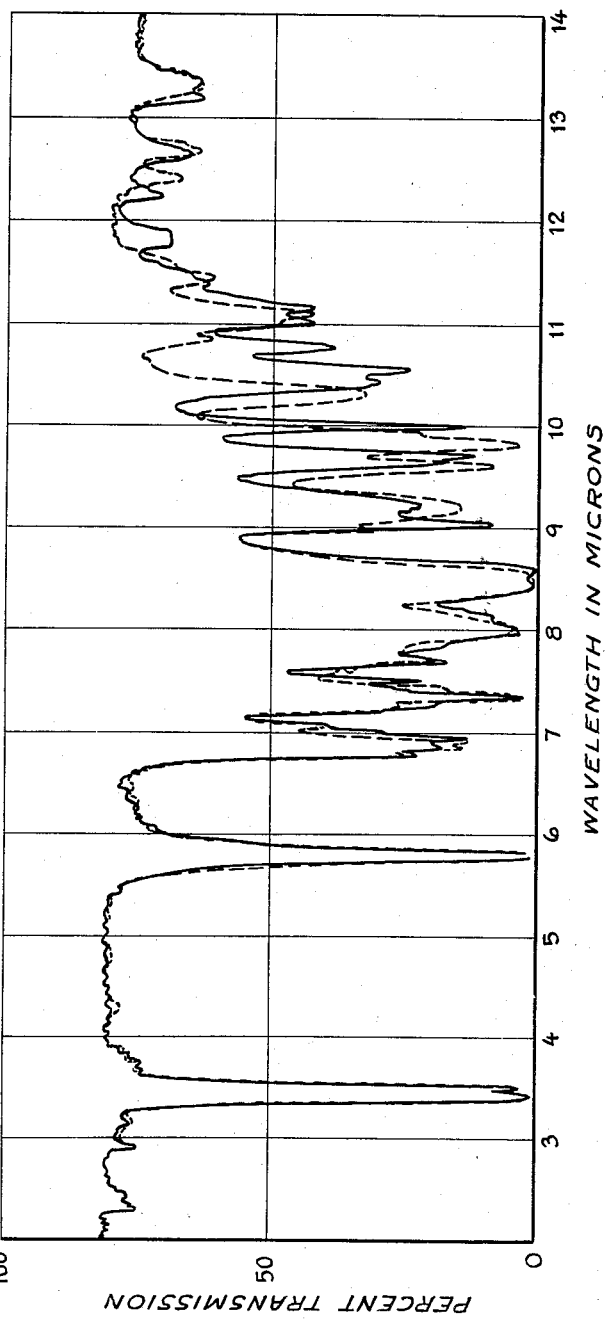

In the said drawings:

Fig. 1 represents an infrared spectrum of cis- and trans-4-tertiary butyl cyclohexyl isobutyrate, Fig. 2 is an infrared spectrum of cis- and trans-4-tertiary butyl cyclohexyl butyrate, Fig. 3 is an infrared spectrum of cis- and trans-4-tertiary butyl cyclohexyl propionate, and Fig. 4 is an infrared spectrum of cis- and trans-4-tertiary butyl cyclohexyl acetate.

In the case of the propionate, butyrate and isobutyrate esters, instead of preparing the propionate, butyrate and isobutyrate esters as set forth in Examples 3 to 5 respectively, we may prepare a mixture of the cis and trans propionates containing a predominant amount of the cis isomer ester by the esterification of the para tertiary butyl cyclohexanol prepared in accordance with Examples 1 or 2. This para tertiary butyl cyclohexanol is a mixture of the cis and trans isomers with a predominant proportion of the cis isomer. Accordingly, when esterified to produce the propionate following the procedure of Example 3, the mixture of cis and trans isomers with a predominant part of the cis isomer ester is obtained. Similarly, the formate and isobutyrate esters may be prepared from the cyclohexanol mixtures of Examples 1 or 2 to form a corresponding mixture of the cis and trans formates and isobutyrates respectively, with the cis ester predominant in each instance.

The expression "lower aliphatic acids" is intended to designate aliphatic acids up to 4 carbon atoms.

What is claimed and desired to be secured by Letters Patent is:

1. A mixture of cis and trans isomers of para tertiary butyl cyclohexanyl ester containing a major proportion of said cis isomer, said ester radical being selected from the group consisting of lower alkanoic acids.

2. A mixture of cis and trans isomers of para tertiary butyl cyclohexanyl acetate in which the cis-trans isomer ratio is greater than 1.

3. A mixture of cis and trans isomers of para tertiary butyl cyclohexanyl propionate containing a major proportion of said cis isomer.

4. A mixture of cis and trans isomers of para tertiary butyl cyclohexanyl butyrate containing a major proportion of said cis isomer.

5. A mixture of cis and trans isomers of para tertiary butyl cyclohexanyl isobutyrate containing a major proportion of said cis isomer.

References Cited in the file of this patent

UNITED STATES PATENTS

| | | |
|---|---|---|
| 2,100,468 | Brubaker et al. | Nov. 30, 1937 |
| 2,433,008 | Whitaker et al. | Dec. 23, 1947 |
| 2,582,743 | Bollmann et al. | Jan. 15, 1952 |
| 2,598,263 | Johnson et al. | May 27, 1952 |
| 2,675,390 | Rosenblatt | Apr. 13, 1954 |

OTHER REFERENCES

Cooke et al.: J. Chem. Soc., 1939, 518–22.

Winstein et al.: J. Am. Chem. Soc., 77 (1955), pp. 5562–78.

UNITED STATES PATENT OFFICE
Certificate of Correction

Patent No. 2,840,599                                        June 24, 1958

Willard T. Somerville et al.

It is hereby certified that error appears in the printed specification of the above numbered patent requiring correction and that the said Letters Patent should read as corrected below.

Column 1, lines 39 to 47 inclusive, the second ring of the formula should appear as shown below instead of as in the patent—

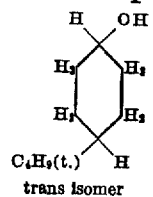

trans isomer column 3, line 57, for "contents" read —constants—; column 4, line 5, for "physica" read —physical—.

Signed and sealed this 26th day of August 1958.

[SEAL]

Attest:
KARL H. AXLINE,
*Attesting Officer.*

ROBERT C. WATSON,
*Commissioner of Patents.*